United States Patent [19]

Hunter et al.

[11] Patent Number: 4,597,255
[45] Date of Patent: Jul. 1, 1986

[54] DEVICE FOR CONTROLLING OPTICAL FIBER TWIST ON A BOBBIN

[75] Inventors: Joe S. Hunter; Paul B. Ruffin, both of Huntsville, Ala.

[73] Assignee: The United States of America as represented by the Secretary of the Army, Washington, D.C.

[21] Appl. No.: 686,048

[22] Filed: Dec. 24, 1984

[51] Int. Cl.⁴ .................. D01H 7/02; D07B 3/02; B65H 59/24
[52] U.S. Cl. ........................ 57/62; 57/264; 242/151
[58] Field of Search ............ 57/59, 60, 61, 62, 63, 57/64, 335, 344, 329, 330, 71; 242/7.21, 7.22, 75.3, 151

[56] References Cited

U.S. PATENT DOCUMENTS

| 919,309 | 4/1909 | Blessing | 57/335 X |
|---|---|---|---|
| 940,231 | 11/1909 | Blessing | 57/335 X |
| 2,307,821 | 1/1943 | Campbell | 57/335 |
| 2,313,618 | 3/1943 | Bridges | 242/7.22 |
| 2,569,612 | 10/1951 | Laurent | 242/7.22 |
| 2,688,837 | 9/1954 | Hadwich | 57/330 |
| 3,385,046 | 5/1968 | Schatz | 57/60 |
| 3,430,429 | 3/1969 | DeCourcy | 57/62 X |
| 3,807,159 | 4/1974 | Hamel | 57/264 X |
| 3,884,025 | 5/1975 | Oberender et al. | 57/335 X |
| 4,129,468 | 12/1978 | Knab | 57/59 X |

FOREIGN PATENT DOCUMENTS

| 682199 | 10/1939 | Fed. Rep. of Germany | 57/59 |
|---|---|---|---|
| 313166 | 10/1902 | France | 57/59 |
| 11083 | of 1910 | United Kingdom | 57/60 |
| 980921 | 1/1965 | United Kingdom | 57/60 |

Primary Examiner—Stuart S. Levy
Assistant Examiner—Joseph J. Hail, III
Attorney, Agent, or Firm—Anthony T. Lane; Robert P. Gibson; Harold W. Hilton

[57] ABSTRACT

A device for controlling the twist associated with optical fiber being wound on a bobbin is disclosed. Signal transmission analysis in fibers wound on bobbins require techniques not normally encountered when considering long straight fibers. Signal loss on a fiber cable payout assembly is mainly due to small bends in the fiber at crossover positions and in the transmission regions where the winding travel changes directions. The signal attenuation in a length of optical fiber is also known to be a function of the amount of twist in the fiber both in the wound and payed out states. This invention allows the amount of twist of the optical fiber to be precisely controlled from zero to full (360 degrees twist per turn of the bobbin) twist to provide optimum signal transmission for both the wound and payed out states.

3 Claims, 7 Drawing Figures

PAYOUT WITH FULL
(360°) TWIST. (WOUND
WITH ZERO TWIST)

PAYOUT WITH HALF
(180°) TWIST. (WOUND
WITH HALF TWIST)

PAYOUT WITH NO
(0°) TWIST. (WOUND
WITH FULL TWIST)

DEVICE FOR CONTROLLING OPTICAL FIBER TWIST ON A BOBBIN

DEDICATORY CLAUSE

The invention described herein may be manufactured, used, and licensed by or for the Government for governmental purposes without the payment to us of any royalties thereon.

BACKGROUND OF THE INVENTION

Fiber that is wound on a bobbin normal (at right angles) to the bobbin axes will be payed out, or dispensed, in a spiral from a missile. Fiber that is wound on a bobbin with a full twist will be dispensed in a straight line from the missile. Full twist is defined as the amount of twist required to cause the fiber to be dispensed in a straight line.

Fiber that is payed out in a spiral is more likely to develop "kinks" and break than is fiber that is payed out in a straight line. From the standpoint of transmission losses due to changes in indices of refraction and losses due to microbending of the fiber, there will be certain advantages realized from optimizing the amount of twist on the fiber.

The present invention allows optical fiber to be wound on a bobbin with the twist varying continuously from zero (no twist) to full (360 degree) twist.

SUMMARY OF THE INVENTION

A device for controlling the twist associated with optical fiber being wound on a bobbin.

The device utilizes a fiber payout spool having an optical fiber wound thereon and a takeup spool to receive the optical fiber from the payout spool. The amount of twist in the fiber is controlled by a twist and tension control device positioned between the two spools. The takeup spool mechanism utilizes a reversing motor and worm gear to allow the spool to move back and forth for a uniform distribution of the optical fiber winding on the bobbin. After completion of the winding operation, the takeup spool is placed in the missile and assumes the role of a payout missile in configuration ranging from a full spiral for every turn of fiber on the bobbin to a straight line, depending on the amount of twist on the fiber.

DECRIPTION OF THE PREFERRED EMBODIMENT

Figure 1:
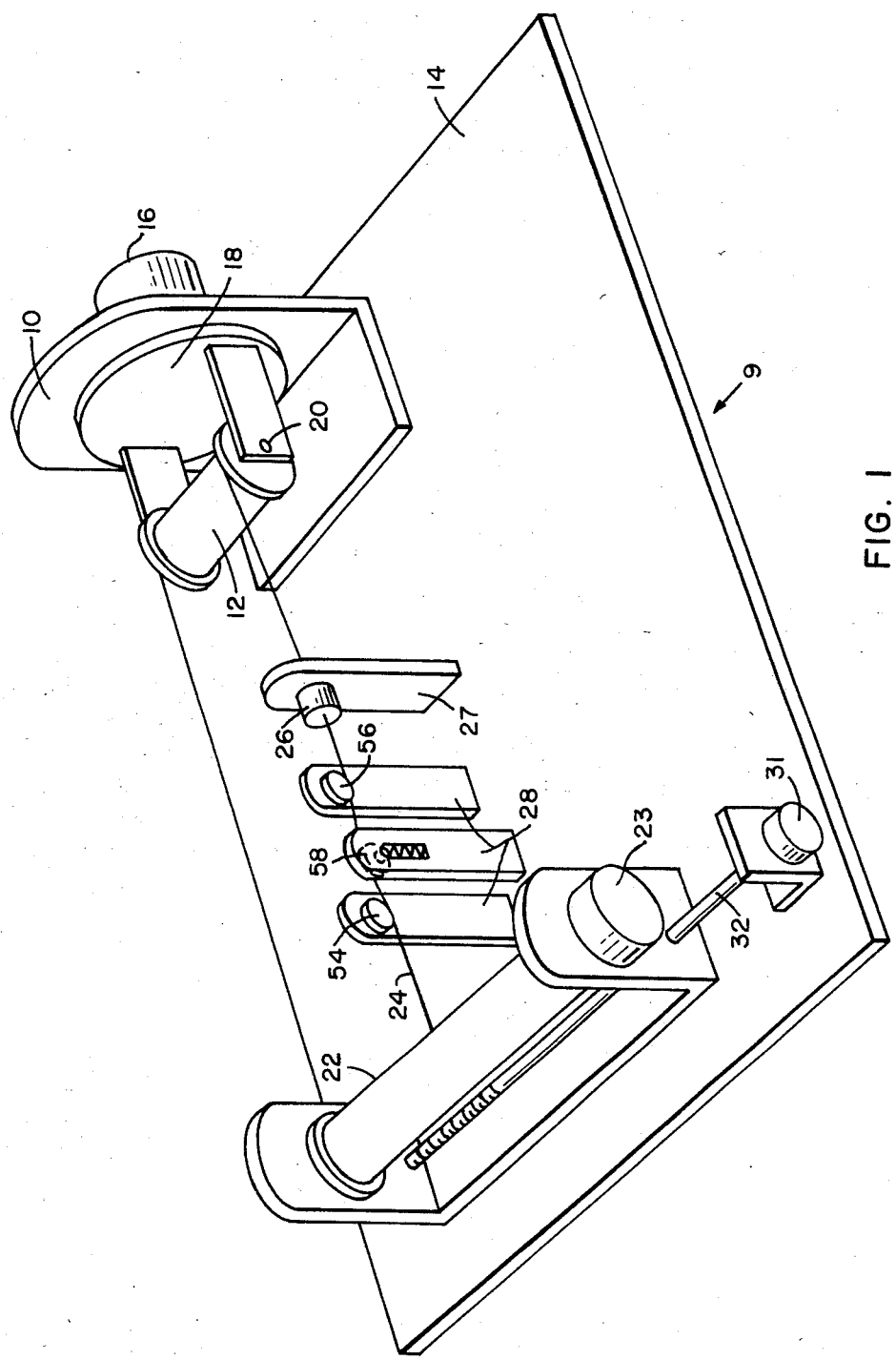
FIG. 1 is a pictorial view of the apparatus of the present invention for controlling optical fiber twist.

As seen in FIG. 1 a device 9 for passing an optical fiber from one bobbin to another while controlling optical fiber twist includes a bracket 10 having a payout bobbin 12 mounted thereon. Bracket 10 is secured to a baseplate 14. A payout bobbin 12 is attached to bracket 10 which is attached to a plate 18. A shaft 20 which operates on ball bearings and allows bobbin 12 to turn freely is mounted on payout bobbin 12 and is used to avoid twist interference between payout bobbin 12 and a takeup bobbin 22 mounted on baseplate 14 in spaced relation from payout bobbin 12. An optical fiber 24 is passed from payout bobbin 12 to the takeup bobbin 22 through a twist and tension control device 26 which is mounted on a support 27 secured to baseplate 14. A tension measuring device 28 is mounted between twist and tension control device 26 and takeup spool 22. The takeup spool 22 is mounted in a yoke 30 which is movably carried on baseplate 14. A reversing motor 31 is connected to a worm gear 32 which is connected to yoke 30 to move the takeup spool 22 back and forth to facilitate a uniform distribution of optical fiber 24 on the takeup spool 22. A motor 23 attached to yoke 30 drives the takeup spool 22. To cause the reversing motor 31 to change the direction of movement of yoke 30, and thus spool 22, an encoder 62 is provided which synchronizes motor 31 with the amount of travel of yoke 30.

Figure 2:
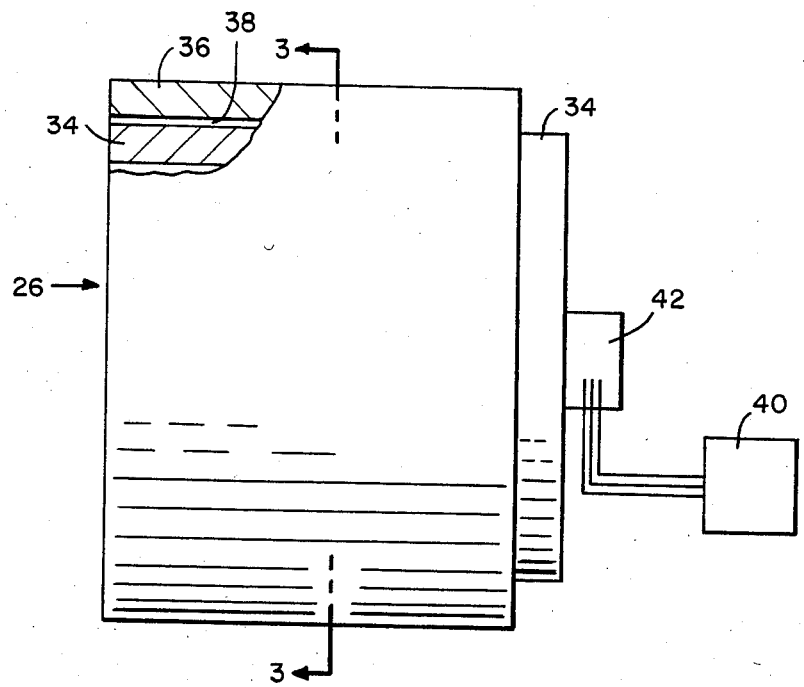
FIG. 2 is an elevational side view illustrating a rotor and stator of the twist and tension control device of the present invention and the power source therefor.
Figure 3:
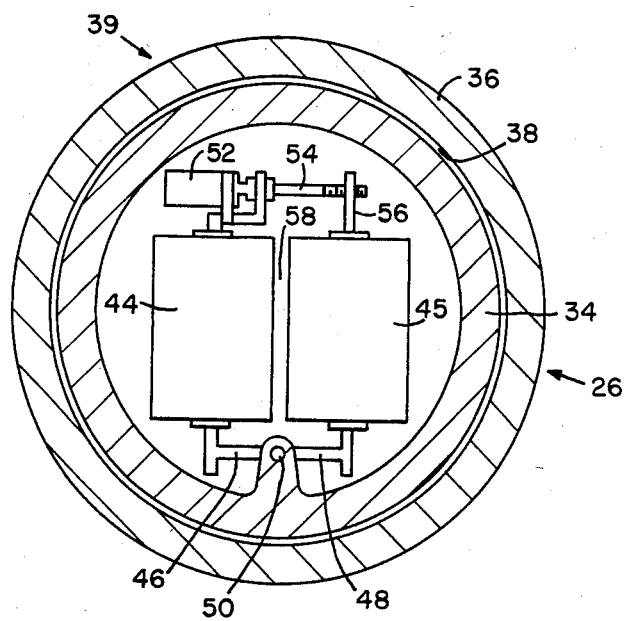
FIG. 3 is a sectional view along line 3—3 of FIG. 2 illustrating the twist control device of the present invention.

Referring next to FIGS. 2 and 3, the approach for controlling the amount of twist on the fiber is disclosed. As seen in FIG. 2, twist and tension control device 26 includes a motor 39 having a rotor 34 and a stator 36. A bearing 38 is disposed between the rotor and stator. Electrical power is transmitted from a source 40 to the twist and tension control device 26 through slip rings 42. The twist and tension control device 26 is mounted in rotor 34.

The twist and tension control device is more clearly seen in FIG. 3 and includes a pair of movable rollers 44 and 45 through which fiber optic 24 passes. Rollers 44 and 45 are mounted on a pair of brackets 46 and 48 which are pivotably mounted in the rotor by a pivot 50. A reversible motor 52 is mounted on the top roller 44 and includes a threaded shaft 54 disposed in threaded relation in a bracket 56 carried on roller 45. Motor 52 receives electrical power from source 40 for rotation of shaft 54 to vary the space 58 between rollers 44 and 45. This varies the degree of contact between the rollers and the optical fiber. As the rollers move inwardly to provide a squeezing effect on the optical fiber the increased friction between the rollers and optical fiber provides a retarding effect on the movement of the optical fiber.

To prevent building up twist between twist and tension control device 26 and the payout bobbin 12, plate 18 is driven by motor 16 and rotates in the same direction and at the same speed as twist and tension control device 26. This requires that encoder 66 (FIG. 5) associated with payout spool motor 16 be synchronized with the twist and tension control motor 39 (See FIG. 3) through a feedback loop (See FIG. 5). The electrical power source 40 which operates the twist and tension device is controlled by a microprocessor.

Figure 5:
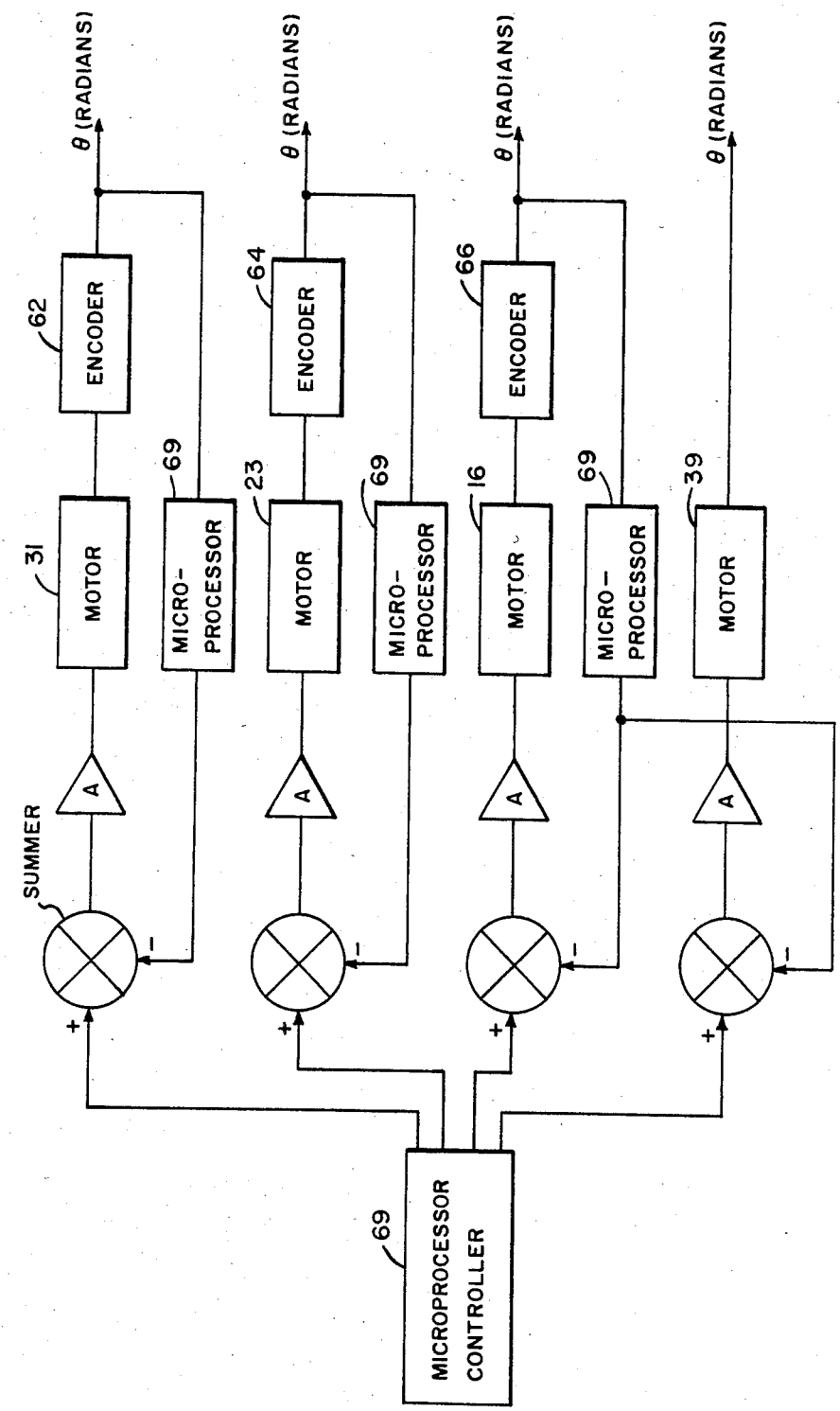
FIG. 5 is a diagrammatic view of the microprocessor controller and servo systems utilized in the present invention.

The amount of twist is controlled by synchronizing the rotor 34 of twist and tension control motor 39 with the takeup spool motor 23 through the microprocessor 69 to provide twist ranging from 0 (no twist) to 360 degrees (full twist). This involves the use of an encoder 66 for both the twist and tension control device shaft and encoder 64 for the takeup spool shaft. Encoder 66 measures the position of both the payout spool motor 16 shaft and the twist and tension control rotor 34. Each encoder operates as part of a feedback loop (FIG. 5). In response to rotation of rotor 34, rollers 44 and 45 are rotated about an axis normal to the longitudinal axis of the rollers.

It is to be understood that the amount of twist which is desired in determined by experimentation. For example, an optical time domain reflectometer (ODTR) can be used to measure the attenuation of the optical fiber for various amounts of twist.

Tension measuring device 28 includes a pair of guide pulleys 54 and 56 having a spring loaded pulley 58 therebetween. A light emitting diode (not shown) is provided to measure the position of the spring loaded pulley. The signal from the light emitting diode is fed back to motor 52 which controls the position of movable rollers 44 and 45. The amount of tension is selectable and is computer (microprocessor) controlled. Once a value is selected, the tension measuring device keeps the preselected tension constant.

In operation, as the fiber is being wound on the takeup spool, the tension measuring device 28 measures the tension in the fiber. When device 28 senses a decrease in tension, motor 52 moves rollers 44 and 45 closer together. When device 28 senses an increase in tension, motor 52 moves rollers 44 and 45 further apart. Rotor 34 makes one complete turn for each turn of fiber from the payout spool 12 for 360 degrees of twist. Motor 16 drives the payout spool 12 in the same direction to prevent the twist from backing up between the twist and tension control device 26 and the payout spool 12.

Figure 4A:
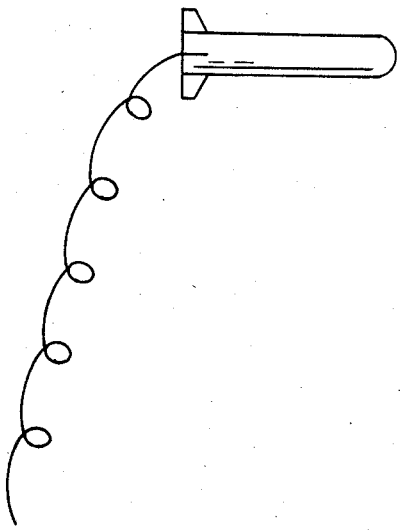
FIGS. 4a-4c illustrate optical fiber payout from a missile.
Figure 4B:
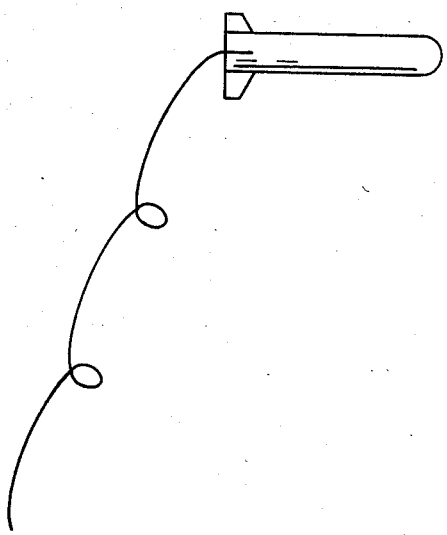
Figure 4C:
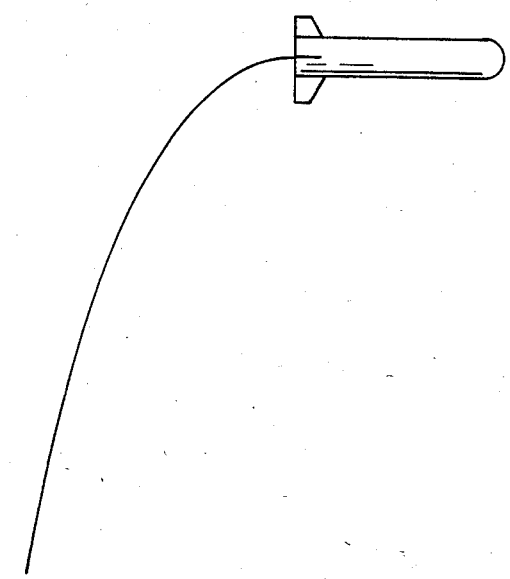

After completion of the winding operation the takeup spool is placed in the missile and assumes the role of a payout spool during the mission. Fiber which is wound on the spool with no twist will be payed out from the missile as illustrated in FIG. 4a. Fiber which has been wound on the takeup spool with 180° twist will be payed out as illustrated in FIG. 4b. Fiber which has been wound with 360 degrees of twist will be payed out as shown in FIG. 4c.

We claim:

1. Apparatus for controlling the twist associated with optical fiber wound on a bobbin comprising:
   a. a payout spool having an optical fiber wound thereon;
   b. a movable takeup spool mounted in spaced relation with said payout spool and disposed for receivimg optical fiber thereon from said payout spool;
   c. a twist and tension control device disposed between said payout spool and said takeup spool for controlling the amount of twist imparted to said optical fiber and for controlling the tension thereof, said twist and tension control device including a stator having a rotor mounted therein, a pair of spaced pivotably mounted rollers disposed for rotation along the longitudinal axis thereof, said optical fiber passing through said rollers, said rollers mounted in said rotor for rotation by said rotor along the axis normal to the longitudinal axis of said roller, and, means for moving said rollers against said optical fiber to provide a squeezing effect thereon to retared the movement of said optical fiber through said rollers, said optical fiber being provided with a predetermined amount of twist responsive to rotation of said rollers by said rotor.

2. Apparatus as in claim 1 including slip ring means mounted on said rotor and a source of electrical power connected to said slip ring means for providing electrical power to the inside of said motor.

3. Apparatus as in claim 2 including a motor mounted on one of said rollers, said motor having a shaft extending therefrom for engagement with the second of said pair of rollers whereby said rollers are pivoted for gripped engagement with said optical fiber therebetween.

* * * * *